United States Patent [19]

Gi

[11] Patent Number: 4,463,203

[45] Date of Patent: Jul. 31, 1984

[54] PROCESS FOR THE PREPARATION OF FUEL OIL, FUEL GAS AND PYROLYSIS COKE BY PYROLYSIS

[76] Inventor: Kim D. Gi, 27-278, Pa-Dong, Susung-gu, Daegu, Rep. of Korea

[21] Appl. No.: 321,259

[22] Filed: Nov. 13, 1981

[51] Int. Cl.$^3$ .......................... C10B 51/00; B09B 3/00
[52] U.S. Cl. ...................... 585/241; 201/21; 201/25
[58] Field of Search ................ 585/241; 201/2.5, 25, 201/21

[56] References Cited

U.S. PATENT DOCUMENTS

| | | | |
|---|---|---|---|
| 1,680,908 | 8/1928 | Nishida et al. | 585/241 |
| 3,704,108 | 11/1972 | Alpert | 585/241 |
| 3,923,472 | 12/1975 | Martinez et al. | 585/241 |
| 3,984,288 | 10/1976 | Yoshida et al. | 201/25 |
| 4,123,332 | 10/1978 | Rotter | 201/25 |
| 4,143,086 | 3/1979 | Carle et al. | 585/241 |
| 4,175,211 | 11/1979 | Chen et al. | 585/241 |
| 4,250,158 | 2/1981 | Solbakken et al. | 585/241 |
| 4,273,643 | 6/1981 | Bennett | 201/2.5 |

FOREIGN PATENT DOCUMENTS

| | | | |
|---|---|---|---|
| 50-32108 | 3/1975 | Japan | 585/241 |
| 51-3506 | 2/1976 | Japan | 201/2.5 |
| 52-22391 | 6/1977 | Japan | 201/2.5 |
| 511659 | 8/1939 | United Kingdom | 252/416 |

OTHER PUBLICATIONS

Encyclopedia of Chemical Technology, edited by Rayond E. Kirk and D. F. Othmer, vol. 4, p. 117; publ. Interscience Encyclopedia, Inc., New York.

*Primary Examiner*—Delbert E. Gantz
*Assistant Examiner*—O. Chaudhuri
*Attorney, Agent, or Firm*—Armstrong, Nikaido, Marmelstein & Kubovcik

[57] ABSTRACT

A process for the preparation of fuel oil, fuel gas and pyrolysis coke by heating to a temperature of 600°–700° C. a mixture of rubber, synthetic resin, brown coal and bentonite.

1 Claim, 3 Drawing Figures

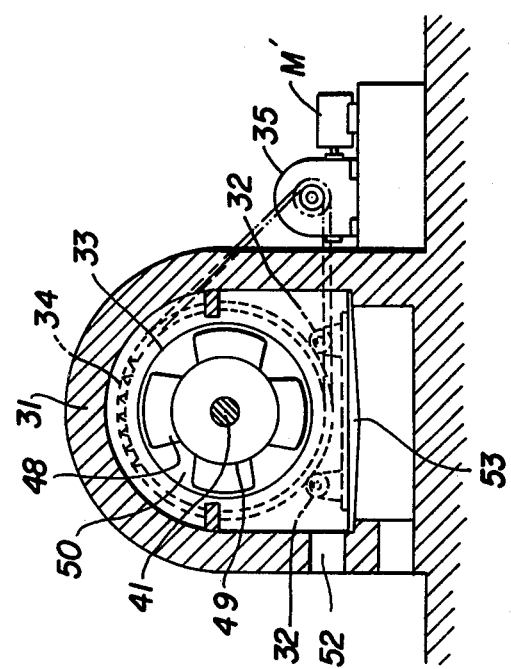

PROCESS FOR THE PREPARATION OF FUEL OIL, FUEL GAS AND PYROLYSIS COKE BY PYROLYSIS

BACKGROUND OF THE INVENTION

The present invention relates to a process for the preparation of fuel oil, fuel gas and pyrolysis coke by pyrolysis waste rubber, waste synthetic resin, brown coal and at least one other component is reduced to powder together forming a mixture of brown coal, 48.5 parts; synthetic resin, 24.2 parts; rubber, 24.2 parts; and bentonite, 3.1 parts by weight. This mixture is heated indiscriminately at a temperature of 600°–700° C. in the pyrolysis reactor. The reactor is a double wrapped cylindrical vessel with a conveyor system. The vessel itself can be rotated continuing to convey the above mixture without the melted residue of mixture attaching on the surface of the reactor as solid and preventing the erosion of the reactor.

It is the new object of today to secure enough energy resources because the exhaustion of the world energy deposits severely hampers industry and economics.

Concerning the above matters, it is the most urgent thing to regenerate and reuse effectively material, i.e., waste rubbers and waste vinyls which form a unsolved pollution problem. Further, it should be noted that brown coal deposits appear to be unlimited now.

In the present invention "low quality coal" or brown coal means the small coal which produces low Calories, i.e., 3,000–4,000 Calories. The use of such coal has generally ceased because of its low heating value, the difficulty of keeping the burning temperature thereof high enough to spread firing properly, even though it continues to burn, the amount of heat produced is not enough to use as heating or cooking and the highest temperature only reaches to a range of no more than 3,000° C. We have developed the invention for solving the above problems as well as using presently untapped energy resources.

An attempt corresponding to the above object has been made to prepare fuel oil by pyrolysis of waste tires of automobiles in Japanese laid-open Patent Application No. Sho 53-114883.

This Japanese Application is characterized in that the raw materials are added to the reactor without reducing the materials to a powder. Gas is blown through the inlet system onto the upper part of a turbulance bed consisting of sand, alumina and other materials with a diameter 1 mm which facilitates the progress of the pyrolysis. The lower part of the turbulence bed installed in the container gathers the non-volatile residue through the outlet system and in the pyrolysis reactor of the heating pipeline that crosses the vessel. The nozzle facilitates the turbulence in the sand or alumina and the other material thereof. At least one end part of the nozzle must be horizontal on the above systems. Difficulties have been eliminated by not using the lower pipeline of the reactor for producing turbulence as before but rather by using the upper pipeline. Any raw material of a size almost alike with the area of transverse section of the turbulence can be put into the reactor.

The above Japanese method has disadvantages in that the degraded rubber by pyrolysis attaches on the surface of reactor vessel and the outlet system as a solid in case of using waste rubber as the sole raw material in the turbulence bed consisting of sand and materials.

In the present invention, the double wrapped reactor vessel having a conveyer therein was used. Pyrogenic reaction was started using brown coal and bentonite to prevent the coherence of the degraded rubber of resin on the reactor and outlet system as a solid. Surprisingly, we dissolved the above disadvantages.

SUMMARY OF THE INVENTION

The present invention relates to a process for the preparation of the fuel oil, fuel gas and pyrolysis coke by pyrolysis characterized in that the heating was done by the use of the well-known double wrapped cylindrical vessel, with a conveyor system installed in the two vessels of cylindrical form. The reactor vessel itself is rotated as simultaneously as the continuous movement of the conveyer, and as the result of conveying continuously the feed material with even heating we have prevented the degraded material from attaching on the surface.

The object of this invention is in that the mixture of waste synthetic resin, waste rubber and brown coal is reduced to powder and by pyrogenetic reaction of the above mixture results effectively in the desired product.

Another aspect of the invention is in that the erosion of the reactor vessel can be reduced surprisingly by the result of preventing the degraded material from attaching on the surface of the internal vessel as a solid formation.

The reaction can proceed as follows by the increase of temperature.

The adhered moisture, $CO_2$, and $CH_4$ on the brown coal was radiated off in the range of temperature 100°–200° C. Gas, water and tar was rapidly released by pyrolysis in the range of temperature of 300°–400° C. The released gas mainly consists of of $CH_4$, hydrocarbons and CO. The pyrolysis can be activated most extremely till reaching 500° C. After exceeding the temperature of 500° the production of tar is hardly present.

During this reaction the brown coal in accordance with pyrolysis proceeded to be softened, melted and therefore promoting the coherence of small particle of brown coal to each other. The mixture radiated a degraded gas, swelled and resulted in a massive form.

Ceasing the reaction within the range of 500°–600° C. is needed to prepare the coke. The production of gas was still in progress and the remaining material was shrunken. At about the 100° C., production of gas from the remaining material was hardly present, and the residue of coke depended upon the time of carbonization.

The carbonization time corresponding to the particular reaction temperature can be fixed by determining the breadth of the vessel.

In the relationship between the breadth of the reactor vessel and the carbonization time, the carbonization time was increased as almost a direct proportion ratio of the square of the breadth of the reactor vessel. For example, the amount of calories necessary for coking the brown coal was 550–700 Kcal. When carbonization time is short, the outer radiation of Calories was as usual increased by the increase of temperature of the reactor vessel which leads to the increase of the evolved gas.

The viscosity of the brown coal is so low that the brown coal mixing with the rubber and resin prevents the resin and rubber from attaching on the surface of the reactor vessel as a solid. Further, the brown coal seems to act on pyrolysis as a catalyst.

Bentonite, so-called wilkinite, mainly consists of Montmorillonite which is a kind of clay. Montmorillonite is main component of Kaolin and its constitution is $SiO_2/Al_2O_3=4$, a small amount of Fe, Mg, and Ca and can include a minimum amount of Mn, Li, and Zn. The crystal is in a structure of stratified form, usually found in the white or gray color of fine particle, and has the character of swelling and being suspended in water. Its refractive index is $\alpha=1.478-1.543$, $\beta=1.500-1,526$ and $\gamma=1.516-1.549$. It is now used as an ion exchange material, so-called, $Al_2O_3.4SiO_2.H_2O$. By adding a small amount of water it forms a high density gel and this tendency of gel formation rapidly is increased by adding a small amount of alkaline material, $M_gO$.

In the present invention Bentonite forms a gel with the melted rubber and resin by reacting with the moisture contained in rubber, resin and brown coal. The produced gel adheres with the brown coal and the alkaline component of $Al_2O_3$, CaO, $M_gO$ promotes forming a gel.

As mentioned, Bentonite and brown coal react to prevent the degraded material from being coherent on the surface of the reactor.

BRIEF DESCRIPTION OF THE DRAWINGS

Drawing 1 is the illustrative outline process of the present invention.

Drawing 2 is the vertical section of the reactor vessel.

Figure 1:
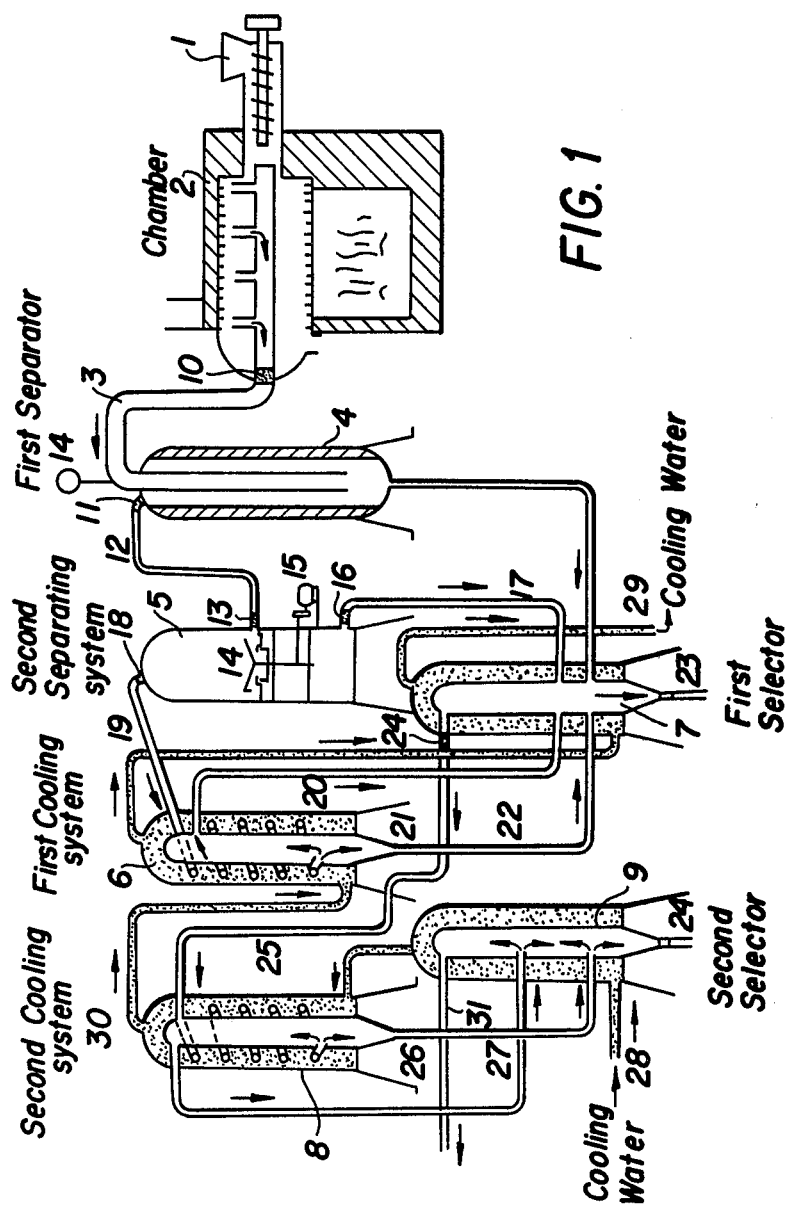
Figure 2:
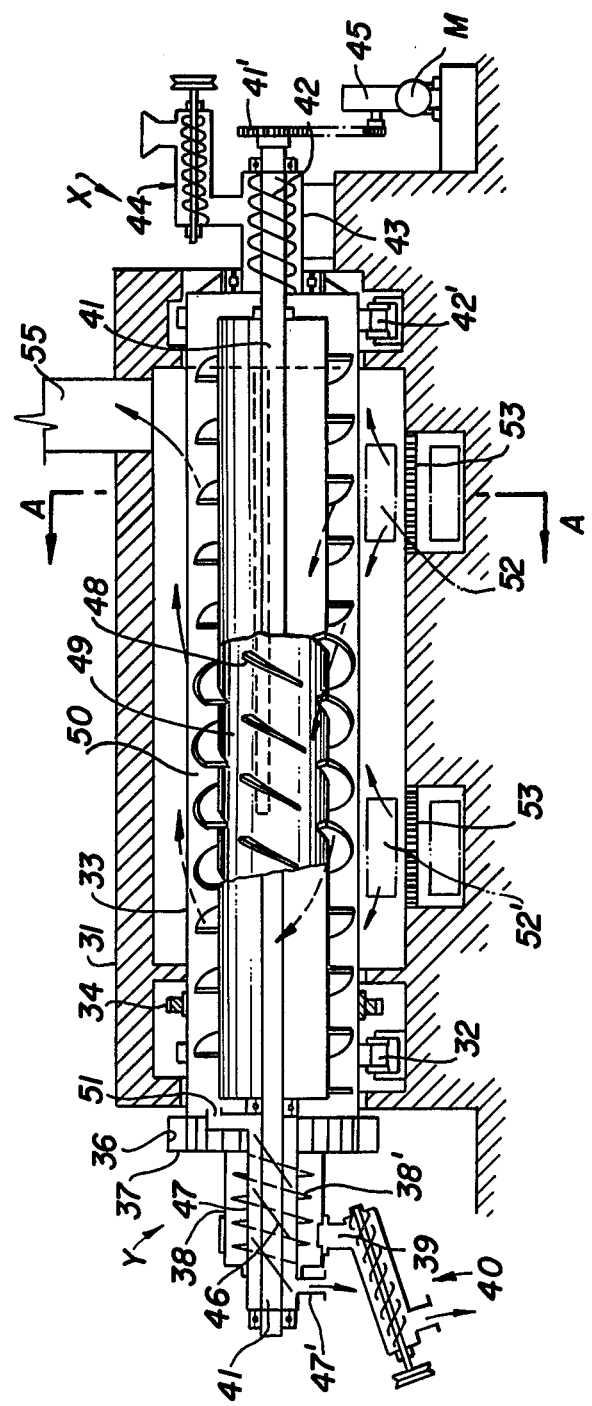

Drawing 3 is the side-view of vertical section at the point of A—A section in FIG. 2.

DESCRIPTION OF THE PREFERRED EMBODIMENTS

The process of the invention can be embodied as follows referring to the drawings.

Drawing 1 illustrates the outline process of preferred example.

The gas produced in the chamber 2 exits through outlet 10 and pipeline 3 and flows to the separator 4 which is the first separating system. A portion of gas remains at the lower part of Separator 4 as a tar formation. The remainder flows through pipeline 12 through the outlet 11 and is passed into the separator 5 through the gas inlet 13. A switch unit 14 is installed in the separator 5 to control the flow of the feed material. The unit 14 is controlled by controller 15. A portion of the injected gas in separator 5 is liquidified and passes through the liquid pipe 17 and into the first selector 7. A portion of gas passes through the gas outlet 18 of the upper part of the separator 5 and into the first cooler 6 through the pipe 19 and is continuously cooled. A portion of the cooled gas from the first cooler flows to the first selector 7 by way of the pipe 20 and is well selected. The cooled liquid from the first cooler 6 flows to the first selector 7 by way of pipe 22 and is discharged through the outlet 23 in the lower part thereof. At the same time a portion of cooled gas from the first selector 7 through the outlet 24 of the upper part of the selector 7, flows to the second cooling system 30 having second cooler 8 by way of the pipe 25, where it is cooled and liquidified and continues to the second selector 9 by way of the pipe 27. There it is well separated and passes through the outlet 24. The remaining residue after cooling flows through the pipe 31 and is used for fuel gas. Cooling water enters the system through pipe 28 and flows successively through the second sector 9, the second cooler 8, the first cooler 6, and the first selector 7. Drawing 2 is the vertical section of the reactor vessel.

The pyrolysis reactor is installed horizontally with the cylindrical rotating furnace 33 supported by the support Roller 32, 42'. A wheel 34 attached to the furnace 33 is rotated at the slow rate regulated by the reduction Gear 35 (Drawing 3), at the lower axis of the Furnace 33. A recess portion 36 around the circumference surface and wings 37 around the internal surface are fitted to the wheel. The cylindrical vessel 33 is equipped with the screw 38'. At one end of the furnace is attached the coke exhauster 40. At the center of the furnace 33 is installed an axle 41 for rotating movement. A screw 42 is attached at the other end part of the axle. The screw 42 is regulated to be rotated together with the material feeder 43. The feed material is put into the Furnace 33 by slow rotation of the gear 41' fixed on the axle 41 in accordance with the speed reduction Gear 45. A screw 46 with rapid gradient is attached to the other end of the axle which acts to remove the waste residue off the internal surface of the outleting vessel 47 which is an extended cylindrical portion 38. A dividing screw 48 and a cylindrical vessel 49 having a diameter smaller than the furnace 33 was fixed on the axle 41 to leave the narrow space between the furnace 33 and the vessel 49. The furnace and vessel 49 are controlled to rotate in same direction by the variable motors M,M'.

As mentioned hereinbefore, the waste synthetic resin, brown coal and at least one other material mixtures are properly added to the feeder 43 by the feeding system 44 and put into the furnace 33 by the Screw 42 of the axle 41. Carbonization follows by the result of heat introduced through gratings 53 and output the flame projectors 52, 52'. The material moves regulately toward Y by action of the dividing screw 48 in the internal cylindrical vessel 49. It then proceeds upward by action of wing 37 on the internal surface of the recess portion 36 and finally removed by way of the screw 38' through the outlet 39 controlled by the coke exhauster 40. The fuel gas exits through outlets 51 and 47'.

The preferred embodiment of the invention is as mentioned above, and following examples are for explanation not for limitation of the invention.

EXAMPLE

The waste rubber and waste synthetic resins were reduced to powder. Brown coal was reduced by a grinding mill. These were mixed at the ratio of rubber-24.2 part, synthetic resin-24.2 part, brown coal-48.5 part and bentonite-3.1 part. The mixture was put into the feeding system and heated in vacuo. By increasing the temperature, the pyrolysis was started and gas was produced until the range of temperature 700°–800° C. The produced gas was compressed in cooler 6 as liquid and was separated. As the production of gas began to cease, we would earn fuel oil, fuel gas and the pyrolysis coke at almost ambient temperature.

The analysis of the above production is: Pyrolysis fuel oil 45 parts (heavy oil 35%, gasoline 22%, kerosene 17.4% and pitch 2.5%), coke 41 parts, fuel gas 9 parts and residue 5 parts by weight.

The calory content of the above coke was analyzed to radiate 5,050 Kcal/g (KS E 3707-79: the Korea National Industrial Research Institute). The produced gasoline was analyzed as:

TABLE 1

| Item Sample | Octane Value | 10% distillation Point (°C.) | 50% distillation Point (°C.) | 90% distillation Point (°C.) | Amount of residue Point (°C.) | Erosion of copperplate | Content (ml/l) | Content of sulfur (%) |
|---|---|---|---|---|---|---|---|---|
|  | $\geq 86.0$ | $\leq 70$ | $\leq 125$ | $\leq 190$ | $\leq 2.0$ | $\leq 1.0$ | $\leq 1.20$ | $\leq 0.1$ |
| A | 87 | 54 | 83 | 144 | 1 | 1 | 0 | 0.08 |
| B | 88 | 59 | 87 | 147 | 1 | 1 | 0 | 0.10 |

(ref.) Test in accordance with KS M 2031-70 (Energy Research Institute of Seoul City)

On the above date, A.B has the following difference that they have been proceeded in the same procedure but used the different composite ratio raw material.

The product of the present invention when compared with usual gasoline can be used in all normal uses.

Especially the fuel oil for automobile of the present invention has been analyzed as:

TABLE 2

| Test | Specification (KS M 2612) | Result |
|---|---|---|
| Specific gravity (API) | — | 0.7601 |
| Color | colored | red |
| Vapor pressure (g/cm) | 0.45–0.85 | 0.44 |
| Erosion of copper | $\leq 1$ | 1 |
| Octane value (Research method) | $\geq 86$ | 89.7 |
| Distillation test |  |  |
| First distillation point (°C.) | — | 38 |
| Final distillation point (°C.) | — | 183 |
| 10% distillation point (°C.) | $\leq 70$ | 59. |
| 50% distillation point (°C.) | $\leq 125$ | 90 |
| 90% distillation point (°C.) | $\leq 190$ | 150 |
| Amount of recovery (%) | — | 980 |
| Residue (%) | $\leq 2.0$ | 1.0 |
| Loss (%) | — | 1.0 |

(ref.) test in accordance with KSM 26123 (Wool San Oil Refinery Facilities of Korea Oil Corp.)

TABLE 3

| | Reaction | Flaming Point (°C.) | Content of Moisture (%) | Content of Ash (%) | Content of Sulfur | Calory (Kcal/Kg) |
|---|---|---|---|---|---|---|
| A | Neutral | 89 | Trace | 0.26 | 0.92 | 10620 |
| B | Neutral | 50 | Trace | 0.58 | 0.65 | 10630 |

(ref.) test in accordance with KSM 2614 78 2057-79 (The Korea National Industrial Research Institute)

A,B has the following difference that they have been proceeded in same procedure but using different composite rate raw material.

The most preferred ratio of mixture of raw material are rubber 24.2 parts, synthetic resin 24.2 parts, brown coal 48.5 parts, bentonite 3.1 parts by weight.

The effectiveness of production was 45%, more effective than the corresponding Japanese Application No. Sho 53-114883 which has done the reaction at the range of temperature 640° C. of 39.7% productivity and the Calories of coke of the present invention was recorded more than 4,500 Kcal.

What is claimed is:

1. A process for the preparation of fuel oil, fuel gas and pyrolysis coke by pyrolysis comprising mixing waste rubber, waste synthetic resin, brown coal and bentonite at the ratio of brown coal 48.5 parts, synthetic resin 24.2 parts, rubber 24.2 parts and bentonite 3.1 parts by weight, and generally heating the above mixtures in a pyrolysis reactor while continuing to convey the mixture in the pyrolysis reactor until at the exit of the reactor, the temperature is in the range of 600°–700° C., thereby producing fuel oil, fuel gas, and coke without melted residue of pyrolysis reaction attaching on the surface of the reactor as a solid form.

* * * * *